Aug. 15, 1961 E. F. ANDREWS 2,996,612

STOP-ON-SIGNAL RADIO TUNING MEANS

Filed July 13, 1953 3 Sheets-Sheet 1

INVENTOR
Edward F. Andrews
R. E. Fowler
ATTORNEY

STOP-ON-SIGNAL RADIO TUNING MEANS

INVENTOR

Edward F. Andrews

R. E. Fowler

ATTORNEY

STOP-ON-SIGNAL RADIO TUNING MEANS

Filed July 13, 1953 3 Sheets-Sheet 3

INVENTOR
Edward F. Andrews
R. E. Fowler
ATTORNEY

United States Patent Office 2,996,612

Patented Aug. 15, 1961

2,996,612

STOP-ON-SIGNAL RADIO TUNING MEANS

Edward F. Andrews, Belleair Beach, Fla., assignor to General Motors Corporation, Detroit, Mich., a corporation of Delaware Filed July 13, 1953, Ser. No. 367,684
18 Claims. (Cl. 250—20)

This invention relates to indexing or stopping means and more particularly to indexing or stopping means for determining the frequency to which radio apparatus is tuned that is actuated upon the receipt of a signal in the apparatus. Radio receivers of this type have been termed "stop-on-signal" and "signal seeking" receivers. They require no manual presetting to automatically tune in progressively the stations or signals that are being transmitted in the band for which the receiver is designed. They are particularly advantageous for use in automobile radio receivers because of the frequent changes in the geographical location in which the receiver is operated or in which the vehicle is driven. With mechanical types of automatic tuning means it is necessary to reset the device in order to obtain the automatic tuning-in of different stations. This is not necessary in the so-called signal seeking type of tuner. Receivers having this type of control are described in previous patents such as Andrews No. 2,493,741.

This type of control or tuner requires driving means for moving the tuning means repetitively across the tuning band, which driving means has previously taken various forms. Some of the earlier forms utilized a reversible electric motor and some of the others spring motors with some provision for recocking the spring when one end of the travel is reached, as, for example, a solenoid in the above-identified Andrews patent. In combination with the scanning means there is also provided indexing or stopping means which is actuated when the tuning means accurately tunes in a station by developing a voltage at that instant to stop the scanning means.

It is an object in making the present invention to provide an improved driving means for the tuning means.

It is a further object in making this invention to provide a spring driven, solenoid return mechanism for the tuning means which is of small compact size.

It is a still further object in making this invention to provide a short stroke solenoid return for recocking the spring motor.

It is a still further object in making this invention to provide a spring driven, solenoid return drive having an inertia member which is charged by the solenoid to continue driving action after the solenoid plunger stops.

It is a still further object in making this invention to provide an improved control circuit for stopping the tuning means accurately on station.

With these and other objects in view which will become apparent as the specification proceeds, my invention will be best understood by reference to the following specification and claims and the illustrations in the accompanying drawings, in which:

Figure 1:
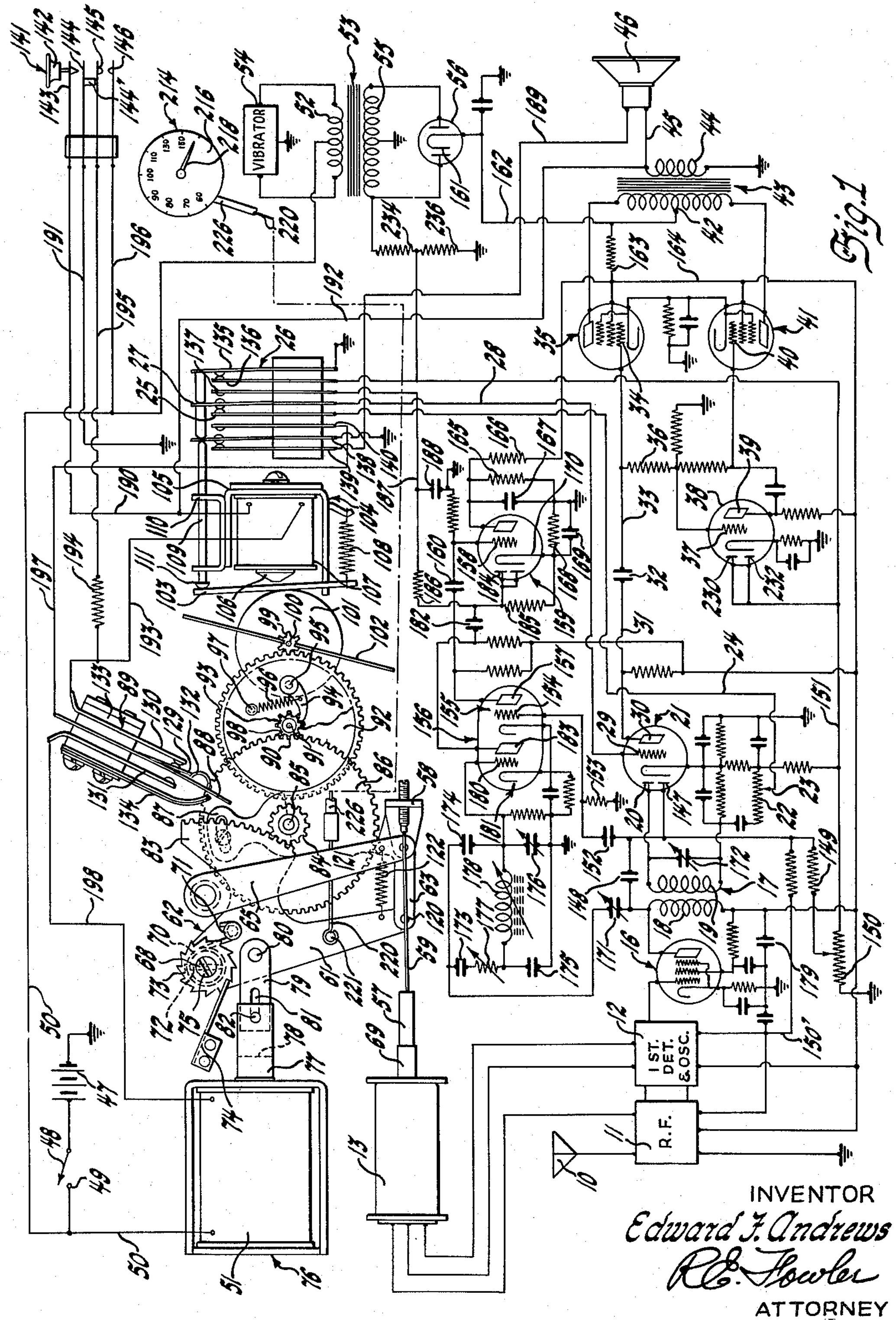
FIGURE 1 is a schematic circuit diagram of a radio receiver embodying my invention.
Figure 2:
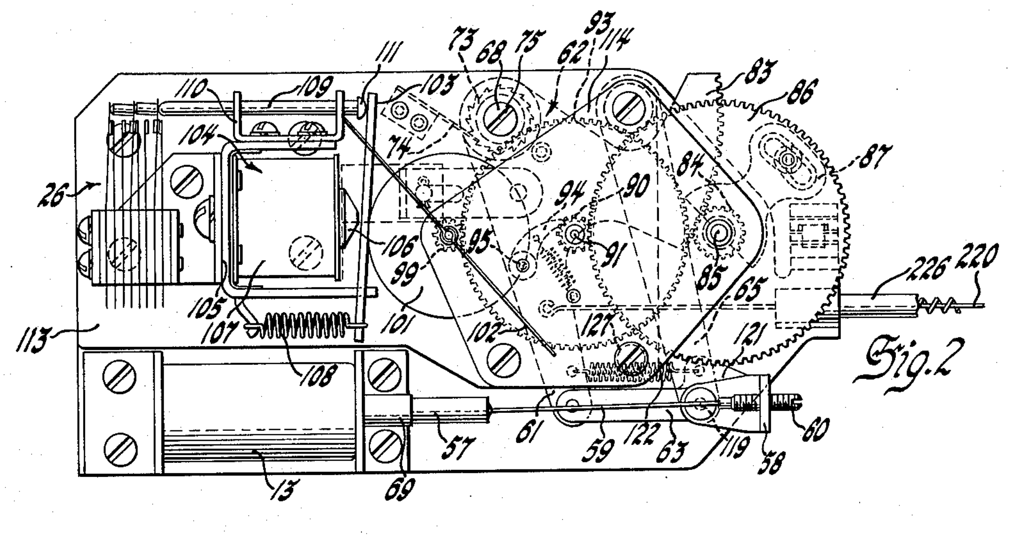
FIGURE 2 is a front elevational view of the tuning apparatus embodying my invention.

Referring now to the drawings and more particularly to FIGURE 1, it will be noted that this figure illustrates schematically an embodiment of the invention as applied to a radio receiver of the superheterodyne type. FIGURE 1 shows an antenna 10 connected to a radio frequency amplifier section 11 labelled R.F. The radio frequency amplifier 11 is in turn directly connected to the first detector and oscillator 12 labelled 1st Det. & Osc., the output of which feeds into an intermediate frequency amplifier tube 16. The radio frequency amplifier and oscillator sections 11 and 12 are provided with adjustable tuning means 13, 14 and 15 (FIG. 7) which in this instance are shown as inductance coils whose value may be varied for tuning.

The output of the tube 16 is connected to primary 18 of an intermediate frequency transformer 17. The secondary 19 of the transformer is connected to a diode-anode 20 of a duo-diode-triode tube 21 to form the second detector. The detected audio frequency signal is developed across the resistance 22 in the diode detector circuit. The adjustable volume control tap 23 on the resistance 22 is connected through line 24 to stationary contact 25 of a multi-pole double throw switch 26. The associated movable switch arm 27 is connected through line 28 to control grid 29 of the triode section of the tube 21, which acts as the first stage of audio amplification.

The plate 30 of the triode section is connected through line 31 to one side of a coupling condenser 32, the opposite side of which is directly connected to control grid 34 of one of the power amplifier tubes 35 through line 33. Conductive line 33 is also connected to one terminal of resistor 36, the opposite terminal of which is connected to the control grid 37 of a phase inverter tube 38. The output from plate 39 of the phase inverter tube 38 is applied to the control grid 40 of the other power amplifier tube 41. Tubes 35 and 41 are connected in push-pull relationship directly across the primary 42 of an output transformer 43. One terminal of the secondary 44 of the output transformer 43 is grounded and the other terminal of the secondary is connected through line 45 to a loud speaker 46.

Power for operating the apparatus is supplied from a source 47 which is herein indicated as a battery and in an automotive vehicle would be the storage battery thereof. One terminal of the battery is grounded and the other connected to movable switch arm 48 of the main energizing switch for the system. The stationary contact 49 of this switch is directly connected to a conductive line 50. Line 50 is connected to one terminal of an operating solenoid coil 51 and extends to a center tap on primary winding 52 of power transformer 53, in this manner supplying voltage to a conventional power supply system including a vibrator 54, which is connected across the main terminals of the primary 52. The secondary 55 of the power transformer 53 has its center tap grounded and is directly connected across a full-wave rectifier 56 which supplies high voltage power for the system. If desired, the on-and-off switch 48 which energizes the power supply may be combined with a volume control rheostat 22 as is conventional in most radio receivers.

Figure 4:
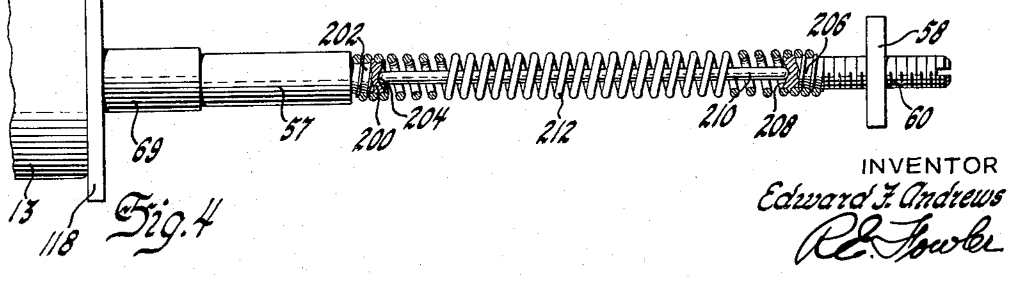
FIGURE 4 is an enlarged detail view partly in cross-section of a modified form of tuning core connecting member.

The variable tuning means 13, 14 and 15 for the receiver may be of any type such as variable capacity or variable inductance, but they are here illustrated as being of the variable inductance or permeability type having powdered comminuted iron cores 57 movable axially within the interior of the associated coils in a known manner. The cores are preferably arranged so that all three cores may move together simultaneously, and this is accomplished by mounting the same on a yoke 58 (FIGURE 7), the movement of which is effected and controlled in a manner to be described. Each core 57 is connected through a flexible thin connector 59 to an externally threaded elongated member 60 that in turn threadedly engages an opening in the transverse yoke 58 so that they may be individually adjusted with respect to each other for aligning the three tuned circuits. Although a thin wire connector may be used, this means may take various forms and one modification of these connectors is shown in detail in FIG. 4. The outer end of each core 57 is provided with a cylindrical extension 200 which has coarse threads 202 and a depression 204 in the end. The inner end of each member 60 has similar threads 206 differing from the threads over the remainder of its length. A central depression 208 is provided in the end of the member 60. A solid resilient wire 210 extends between each core 57 and member 60 with its ends resting in the depressions 204 and 208. A spirally wound casing 212 surrounds the wire 210 and is threaded on the core and member. This provides a transmission member rigid longitudinally but flexible transversely.

The yoke 58 is operatively connected to an arm 61 of a pivoted lever 62 by means of an arm 63 rigidly connected to the yoke 58 at one end thereof and pivotally connected to the arm 61 at its other end. The yoke 58 is provided with two spaced ears 64 by which it is pivotally secured to the ends of a pair of arms 65 which are in turn rigidly fastened to a hub 66 freely rotatable about a shaft 67. The connection of the yoke 58 to the arms 65 causes the yoke to follow a path which departs only slightly from straightline motion. The lever 62 is rotatable about a shaft 68 and when it is rotated in a clockwise direction as seen in FIGURE 1, the yoke 58 will move to the left and cause the cores 57 to move into the tuning means.

The cores 57 are guided within the tubular members 69 which project from the tuning means so that when the yoke 58 rises or falls as the cores move into the tuning unit, the result will be that the connecting members 59 will bend without affecting the positioning of the cores. The tuning cores are moved in the tuning direction by a torsion spring 70. One end of the spring is secured to the lever 62 by a pin 71 and the other end is fastened to the shaft 68 by a pin 72. A ratchet disc 73 is also secured to the shaft 68 by the same pin 72. A leaf spring member 74 secured at one end to some stationary portion is so mounted that its free end engages the teeth on the ratchet disc 73 to prevent the shaft 68 from turning in one direction. The spring 70 may be wound up to any desired tension by turning the shaft 68 together with the ratchet disc 73 in a counterclockwise direction, as seen in FIGURE 1. A screwdriver slot 75 in the end of the shaft 68 is provided for this purpose.

The spring 70 moves the tuning cores 57 out of the tuning means to the high frequency end of the tuning range. The spring 70 is retensioned and the tuning cores moved into the tuning means to the low frequency end of the tuning range by means of a strong solenoid designated as a whole by the reference character 76. The solenoid is provided with a magnetic winding 51 previously mentioned and has a ferromagnetic plunger 77 which extends into the winding and is provided at its outer end wtih a slot 78. The plunger 77 is operably connected to the lever 62 by a connecting link 79. One end of the link 79 is pivotally secured to the lever 62 by a pin 80; the other end of the link enters the slot 78 in the end of the plunger 77 and is provided with an elongated opening 81. A transverse pin 82 extends transversely through the slotted end of the plunger 77 and through the opening 81 in the link; thus the link 79 may slide with respect to the plunger 77.

Lever 62 is provided with an arm to form a gear sector 83. This gear sector 83 meshes with a pinion 84 fixed to a shaft 85. A gear wheel 86 is also rigidly mounted on the shaft 85 and adjustably carries a switch operating member 87 which is adapted to engage the switch operating spring 88 (FIG. 6) of a limit switch 89. The arm 61 and the sector gear 83 and pinion 84 are so proportioned to the travel of the cores 57 in the tuning means as to cause the gear wheel 86 with the switch operating member 87 thereon to rotate slightly less than 360 degrees. A pinion 90 loosely mounted on a shaft 91 meshes with gear wheel 86 and carries a flywheel 92. A gear wheel 93 is rigidly secured to the shaft 91 and carries a ratchet pawl 94 on a pivot 95. A spring 96 is attached at one end to the pawl 94 and is secured at its other end to a pin 97 carried by the gear wheel 93. The spring 96 urges the end of the ratchet pawl 94 into engagement with ratchet teeth formed on a section 98 of the pinion 90. The ratchet is so arranged that when the tuning cores are being withdrawn from the tuning means the gear wheel 93 is driven positively. When the tuning cores are being returned into the tuning means the ratchet slips and acts to disengage the gear wheel 93 from the pinion 90.

A pinion 99 meshes with the gear wheel 93 and is rigidly mounted on a shaft 100. A brake disc 101 and a wind vane governor 102 are also rigidly secured to the shaft 100. The brake disc 101 is adapted to be engaged by the pivoted armature 103 of the relay 104. This relay consists of a U-shaped member 105, a core 106, and the armature 103, all of ferromagnetic material. A coil 107 is wound around the core 106 to form the operating winding of the relay. The armature 103 is urged against the brake disc 101 and in a direction to open the magnetic circuit of the relay by a spring 108. A rod 109 slidably mounted on the relay by means of a U-shaped bracket member 110 is provided with an enlarged portion 111 which is engaged by the armature 103. The other end of the rod 109 operably connects with a multi-contact switch assembly generally indicated by the reference character 26.

Figures 5, 6, 7:
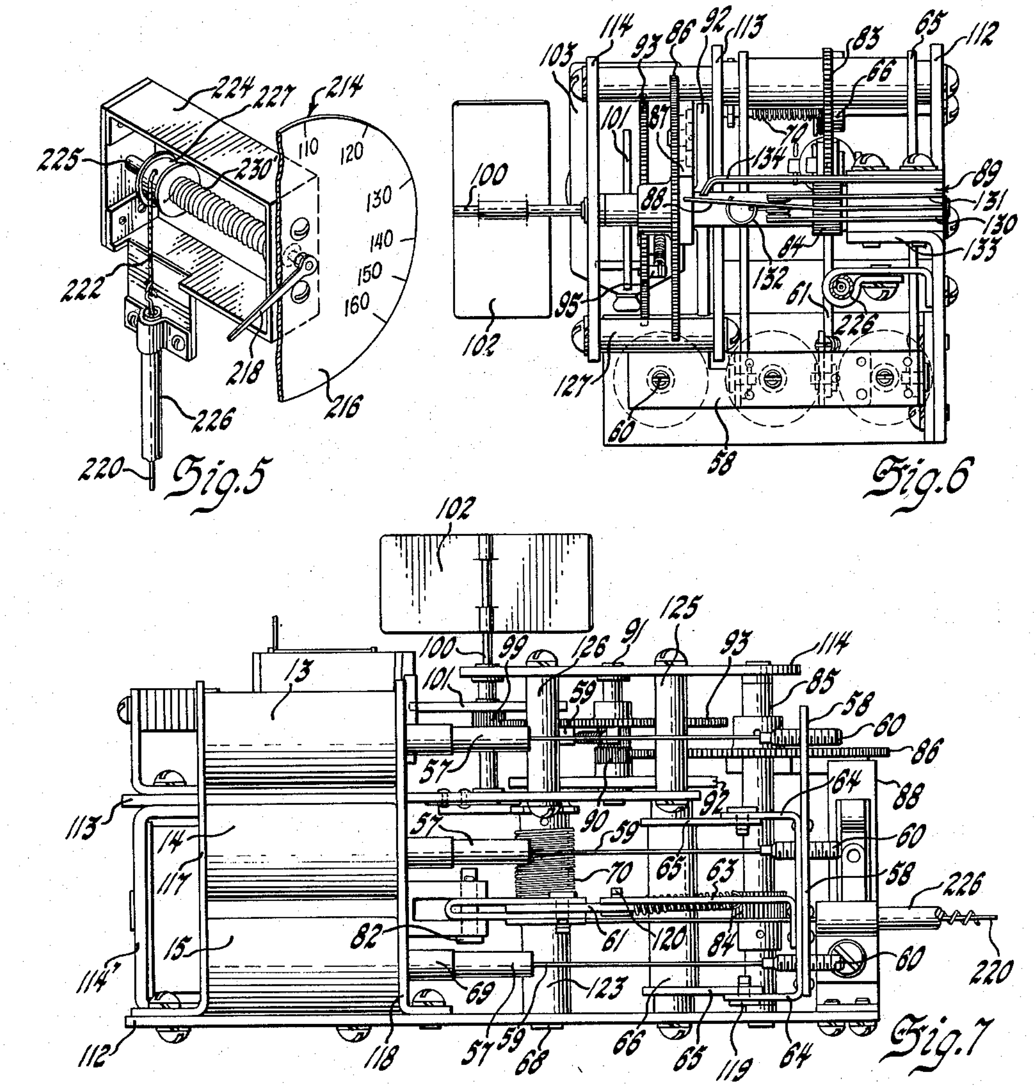
FIGURE 5 is a detailed isometric view of the tuning indicator.
FIGURE 6 is a side elevational view of the apparatus shown in FIGURE 2.
FIGURE 7 is a bottom plan view of the apparatus shown in FIGURE 2.
Figure 8:
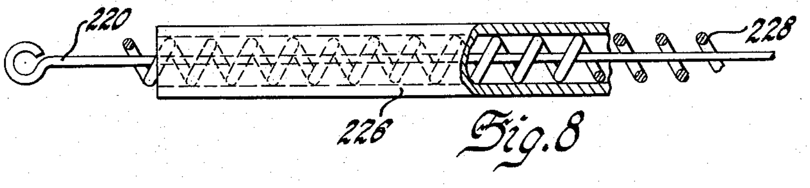
FIGURE 8 is an enlarged fragmentary view in partial cross-section of the cable connecting the indicator and the main apparatus.

An indicating means 214 for the tuning means is shown schematically on FIG. 1 and in more detail in FIG. 5. Referring first to FIG. 1, it will be seen that the indicating means consists of a calibrated dial 216 over which an indicating needle 218 is moved by movement of the operating lever 61 through a Bowden wire type drive. One end of an operating wire 220 is pivotally secured to the lever 61 by pin 221. A tubular housing 226 enclosing said wire is suitably supported in proper configuration to support and guide the wire between the lever 61 and the dial assembly 214. As best shown in FIG. 8, within the tubular housing 226 is a spirally wound wire liner 228 with considerable spacing between adjacent turns. This reduces the internal friction considerably. As shown in FIG. 5, the opposite end of the operating wire 200 is connected to a cable 222. A stationary framework 224 has secured to one end, dial 216; a shaft 225 is rotatably supported by said framework and extends through the center of the dial 216. The indicating needle 218 is secured on the end of the shaft to move over the dial surface. Within the framework 224, a drum 227 is mounted on shaft 225 and the cable 222 connected to the end of wire 220 is anchored to the drum to be wound around the same. A torsion spring 230′ is mounted around the shaft 225 to bias it for rotation in one direction, one end of the spring being anchored to drum 227 and the other end to the framework 224. This biases the needle for clockwise rotation as shown, and as lever 61 moves to the right as shown in FIG. 1, will pull on the wire and keep it taut and rotate the needle 218 to give a correct indication of the position of the tuning means with respect to the frequencies tuned in the band. When the tuning means is returned by the solenoid 76, the torsion spring 230′ will permit the wire 220 to be pulled back by the lever 61.

Reference will now be had more specifically to FIGURES 2, 3, 6 and 7 which illustrate in detail the constructions illustrated schematically in FIGURE 1. The assembly consists of three spaced-apart plates 112, 113 and 114. The plates 112 and 113 are held parallel to each other in spaced-apart relation by the U-shaped members 114' and 115, which compose the ends of the solenoid 76. The shaft 67, on which the hub 66 of the levers 65 rotates, also serves as a spacer between the plates 112 and 113 to form a more rigid construction. The U-shaped member 114' carries a plug 116 of magnetic material projecting into the solenoid coil 51 and acting as a stop to limit the travel of the plunger 77 when the coil is energized. The tuning means 13, 14 and 15 are mounted between L-shaped brackets 117 and 118 which are secured to the plate 112 by machine screws, as best seen in FIGURE 7.

The ears 64 attached to transverse yoke 58 are pivotally secured to the ends of the levers 65 by pins 119. The link 63 is secured to the yoke 58 intermediate the ears 64 and is pivoted at its free end to the lever 61 by a pin 120. The link 63 is provided with a lug 121 to which one end of a tension spring 122 is connected. The other end of the spring 122 is connected to the lever 61. This spring 122 serves to take up any lost motion between the lever 61 and the link 63 at the pivot pin 120. The shaft 68 upon which the lever 62 rotates is mounted for free rotation in bearings in plates 112 and 113. The lever 62 is mounted on a hub 123 which is rotatably mounted on the shaft 68. The ratchet disc 73 is provided with a hub 124 which serves as a spacer between plate 113 and the lever 62 and also provides a support for the torsion spring 70. This hub 124 is rigidly secured to the shaft 68 by pin 72. The plate 114 which carries bearings for shafts 85, 91 and 100 is held in spaced relation and parallel to plate 113 by machine screws and spacers 125, 126 and 127. The shaft 85 is mounted for free rotation in bearings carried by plates 112 and 113. This shaft is reduced in diameter at the bearings to reduce the friction. The shaft 91 to which gear wheel 93 is fixedly secured, and the shaft 100 to which the brake disc 101, pinion 99 and wind vane 102 are fixed, are mounted for free rotation in bearings carried by the plates 114 and 113. The pinion 90 which carries flywheel 92 and is freely rotatable on shaft 91 is reduced in diameter at the end adjacent the gear 93 to form ratchet teeth 98 which cooperate with the pawl 94 carried by the gear wheel 93.

The limit switch 89 (FIGS. 1 and 6) comprises contact carrying spring blades 129, 130 and 131. A toggle link 132 is compressed between the contact spring blade 129 and the switch operating spring 88. When the switch operating member 87 which is secured to the gear wheel 86 engages the end of the switch operating spring 88 and moves it in one direction, the toggle link 132 causes the contact blade 129 to move in the opposite direction with a snap action. The switch 89 is secured to a bracket 133 which is formed integrally with the plate 112. A multi-leaf spring 134, the purpose of which will be described hereinafter, also forms a part of the switch assembly.

The relay operated switch assembly 26 consists of a plurality of single pole double throw switches mounted in a bank. It consists of a movable spring contact carrying arm 135 which cooperates with a single stationary switch contact 136, a second movable spring contact carrying arm 27 which oscillates between two substantially stationary contacts 25 and 137, and a third movable spring contact carrying arm 138 which oscillates between two stationary contacts 139 and 140. Spacing means is provided between spring contact carrying arms 135, 27 and 138, which are in alignment so that pressure upon the surface of the end of spring contact carrying arm 138 will cause simultaneous movement of spring contact carrying arms 27 and 135.

The end of rod 109 engages one face of the end of spring contact carrying arm 138 to cause actuation of the switch under certain circumstances. The arms 138, 27 and 135 are biased to close with contacts on the left as viewed in FIG. 1.

The switching mechanism for initiating motion of the tuning mechanism so that it will move on to the next station which is available, indicated generally at 141 in FIG. 1, consists of a manually depressible button 142 carried on a spring arm 143 engageable with a contact on a second arm 144 which is spaced from a third arm 145 by a rigid insulating member 144', the assembly being deformable to cause closure of a second switch consisting of two contacts carried by arms 145 and 146. When button 142 is depressed, a first circuit will be closed between arms 143 and 144 and additional movement of the button 142 inwardly will close a second circuit between arms 145 and 146.

Referring again to the circuitry of FIGURE 1, the plate of the I.F. amplifier tube 16 is coupled to the automatic volume control diode 147 of the tube 21 by a coupling condenser 148. The negative automatic volume control voltage is developed across a resistor 149 in series with that portion of the resistance 150 between the position of the adjustable tap and ground and is applied back to the grids of the tubes in the sections 11 and 12 of the receiver through line 150'. The ungrounded end of the potentiometer 150 is connected through conductor 151 to switch contact 136 in the relay control switch 26.

A pair of rectifying diodes 230 and 232 of tube 38 are commonly connected to line 151. Two resistors 234 and 236 are connected in series between one end of transformer winding 55 and ground. A tie line is connected between line 151 and the junction between resistors 234 and 236.

Potentiometer 150 is employed as a sensitivity control to adjust the sensitivity during tuning when it is desired not to tune in the weaker stations. The end of the resistance 150 remote from ground is negative with respect to ground. Moving the adjustable slides toward the negative end places an increased negative bias on the automatic volume control voltage on the lead 150' and thus changes the sensitivity. The negative voltage across resistor 150 is supplied by lead 151 from the intermediate point between resistors 234 and 236, which alternating current voltage is rectified by the diodes 230 and 232 of the tube 38. The potentiometer 150 is effective to adjust the sensitivity only during tuning periods as it is shorted out by switch 135 and 136 when the tuning is completed.

A portion of the intermediate frequency voltage present at the diode plate 147 is coupled by means of a capacitor 152 and resistor 153 to the grid 154 of a triode amplier 155. This triode amplifier may be one section of a duo-triode electron tube 156. The plate 157 of the triode 155 is coupled to the grid 158 of a diode-triode tube 159 through a condenser coupling 160. High voltage for the plate circuits of the receiver is obtained from the cathode 161 of the rectifier tube 56 through the conductor 162, dropping resistor 163, and conductor 164. Reduced voltage is applied to the triode plate of tube 159 through a voltage divider consisting of resistors 165 and 166, and the plate is bypassed to ground by capacitor 167. A resistor 168 shunted by a capacitance 169 is connected between the cathode 170 of tube 159 and ground. The triode section of tube 159 functions as a rectifier of the reflex or infinite impedance type, and when supplied by a signal amplified by triode section 155 of the tube 156 applied to the grid of the tube 159 results in a direct current voltage drop across cathode resistor 168, producing a positive potential at the cathode of tube 159, which increases as the input signal increases. When the receiver is being tuned through a signal, the positive potential at the cathode of the tube 159 rises and falls in a manner determined by the selectivity curve of the receiver at the primary 18 of the intermediate frequency transformer 17.

An intermediate frequency balanced bridge circuit is provided to supply a restraining voltage which is combined with the positive voltage developed across the cathode resistor 168 to produce a precise and sharply peaked operating signal for exact tuning. The balanced bridge circuit is similar in many respects to the one disclosed in the patent to William J. O'Brien No. 2,426,580, issued August 26, 1947. The balanced bridge circuit as shown herein consists of two separate sections. The first includes the intermediate frequency transformer 17 with its primary winding 18, primary adjustable tuning capacitor 171 connected thereto, secondary winding 19 and its associated tuning capacitor 172, all enclosed within and shielded by a metal container. The second includes a second metal shielding container enclosing the remaining components of the balanced bridge circuit. These comprise fixed condensers 173, 174 and 175 and a variable capacitor 176. These capacitors are connected in the form of a square with common connections between capacitors 173—174, 174—176, 176—175. However, in the case of the connection between capacitors 175 and 173 a variable resistor 177 is serially connected. A variable inductance 178 is connected across the square. All of these elements are contained in the second metallic container. The circuit between the two sections of the bridge is completed through ground and bypass capacitor 179.

The primary 18 of the transformer 17, capacitors 171, 173 and 175, bypass capacitor 179, resistor 177 and the mutual reactance of capacitor 174 constitute a tank circuit tuned to the intermediate frequency. Capacitor 175, inductance 178, capacitor 174, together with the mutual reactance of capacitor 176 also constitute a tank circuit tuned to the intermediate frequency. This circuit is excited through capacitor 174. The coupling of these tank circuits through capacitor 175 is inversely proportional to the frequency while the coupling occurring through the capacitor 174 which energizes the coil 178 which is energized by a portion of the primary tank circuit current flowing through condenser 174 is directly proportional to the frequency. Due to these opposing electrostatic and electromagnetic couplings and the parameters of the elements of the two tank circuits, when a signal of exactly intermediate frequency is received by the primary 18, the potential across capacitor 176 is a minimum. In other words, the effect of the coupling occurring through capacitor 174 produces a voltage drop across the inductance 178 which is equal and opposite to the voltage drop occurring across the capacitor 175 at resonance. The value of the resistor 177 is adjusted so as to bring the voltage across the capactor 175 180° out of phase with the voltage across the inductance 178.

Under these conditions there will be substantially zero voltage across the capacitor 176 at resonance. In one aspect the arrangement of the coupled circuits may be considered as a balanced bridge circuit or a circuit providing zero coupling at resonance. On the other hand if the signal received by the primary 18 is slightly out of resonance there is no longer a balance between the opposing couplings. That is, the effect of one coupling is greater than that of the other and a potential varying with the departure from the resonance frequency exists across capacitor 176. Thus it will be seen that when a station is accurately tuned in, no signal, or a minimum signal in case the balance between the two tuned circuits is not quite exact, is present across the capacitor 176. When the frequency of the incoming signal differs by two or three kilocycles from the intermediate frequency to which the balanced bridge circuits were adjusted, a very large voltage is present across capacitor 176. This voltage is applied to the grid 180 of a second triode section 181 in the tube 156. This triode 181 is connected in the conventional manner as a resistance coupled amplifier.

Capacitor 182 couples the plate 183 of triode 181 to the diode plate 184 of the tube 159. A resistor 185 is connected from the diode plate 184 to the cathode 170. The diode plate 184 and the cathode 170 together with the resistor 185 form a rectifying circuit which acts to produce a direct current across resistor 185 when current of intermediate frequency is being supplied to diode plate 184 through coupling capacitor 182. The arrangement is such that the direct current potential at the diode plate 184 is negative with respect to the cathode 170 of the tube 159. The diode plate 184 is connected through a resistor 186 and conductor 187 to contact 137 of the relay operated switch 26. The resistor 186 and a bypass condenser 188 serve as a radio frequency filter. It may be seen that with respect to ground, resistors 185 and 168 are connected in series. The algebraic sum of the positive voltage developed across resistor 168 and the negative voltage across resistor 185 results in a potential difference between conductor 187 and ground. This sum produces a sharp substantial pulse at resonance to accurately control relay 104.

After a station has been tuned in, the relay 104 and the switch 26 are in the condition shown in FIGURE 1. The magnetic circuit of the relay is open and the spring 108 causes the armature 103 of the relay 104 to press against the brake disc 101. When the relay 104 and the relay switch 26 are in this condition, tubes 38, 35 and 41 and the triode section of the tube 21 function as a conventional audio amplifier to operate loud speaker 46. The adjustable contact 23 of the volume control resistor 22 is connected to the grid 29 of the tube 21 through conductor 24, contact blades 25 and 27 of the relay switch 26, and conductor 28. The winding 44 of the output transformer 43 is connected to operate loud speaker 46. The circuit is completed from the grounded end of the winding 44 through the winding itself, through conductor 45, loud speaker 46, conductor 189, and contact blades 139 and 138 to ground.

To initiate tuning, the switch 141 is actuated. When this switch 141 is pushed inwardly, arm 143 engages arm 144 to complete a circuit from one end of the relay winding 107 to ground through conductors 190 and 191 and at the same time mute the loud speaker by connecting the high potential end of the winding 44 to ground through conductor 192 which extends to conductor 190. Sequentially as the button 141 is continued to be depressed, contact is next completed between blades 145 and 146 which completes a circuit from the other end of the relay winding 107 through conductor 193, resistor 194, conductor 195, the blades 145 and 146, conductor 196, conductor 50, contact 49, switch 48, and battery 47 to ground. This energizes the relay winding 107 which results in the armature 103 being drawn against the pole face 106 of the relay 104, releasing the brake disc 101 for free rotation, and at the same time operating the relay switch 26, by means of the push rod 109, into a second position.

This operation of the switch 26 connects conductor 187, through contact blades 27 and 137 and conductor 28, to the grid 29 of the tube 21, and simultaneously deenergizes the relay winding by completing a circuit to ground from one end of the relay winding 107 through conductor 193, contacts 130 and 129 of the limit switch 89, conductor 197, and contact blades 140 and 138. It should be noted that the contact between switch blades 139 and 138 of the switch 26 is broken at this time to open the loud speaker circuit. The relay 104, however, does not open as it is of the flux latch type such as disclosed in a patent to Edward F. Andrews No. 2,541,018. The core 106 of the relay 104 is constructed of ferromagnetic material having a characteristic such that when the coil 107 is energized by manual operation of the tuning button 141 to cause the armature 103 to be pulled into closed contact with the pole face 106 of the core, there will be sufficient residual magnetism remaining in the closed magnetic circuit of the relay after the switch 141 is released to hold the armature 103 in the closed position against the tension of the spring 108. Relay 104, however, has only one operating coil 107 instead of two. In order to return the relay armature to deenergized position, an opposing field created by applying voltage of opposite polarity to coil 107 to oppose the residual magnetism and allow spring 108 to move armature 103.

When the relay 104 is energized, releasing the brake disc 101, the shaft 100 is driven through the gear train under the influence of the torsion spring 70. When the gear train is driven in this direction, the ratchet pawl 94 provides a positive connection betwen gear wheel 93 and pinion 90. The aerodynamic resistance of the wind vane 102 which rotates with shaft 100 provides a governing action to regulate the speed of the gear train and the rate at which tuning cores 57 are withdrawn from the tuning mechanism. It no signal is received, the spring 70 continues to drive the tuning means until the switch operating member 87 moves the switch operating spring 88 a sufficient distance to cause the toggle link 132 to move the contact spring 129 away from contact spring 130 and into contact with contact spring 131, thus energizing the solenoid winding 51. The solenoid energizing circuit is completed from the battery 47 through switch 48, solenoid winding 51, conductor 198, contact blades 131 and 129 of switch 89, conductor 197, and contact blades 140 and 138 of switch 26 to ground.

When the solenoid 76 is thus energized, the plunger 77 is drawn into the solenoid coil 51 and the lever 62 is rotated about its pivot shaft 68 in a clockwise direction, as viewed in FIGURE 1, thus retensioning the torsion spring 70 and at the same time moving the tuning cores 57 into the tuning coils. Simultaneously the gear sector 83 carried by the lever 62 drives the pinion 84 and gear wheel 86 to which switch operating member 87 is fastened in a counterclockwise direction, as viewed in FIGURE 1. Pinion 90 and flywheel 92, with the ratchet pawl 95, rotate in a clockwise direction at this time, which is the non-driving direction, so that the gear wheel 93 and the shaft 100 remain stationary since the pawl slips over the ratchet teeth.

Figure 3:
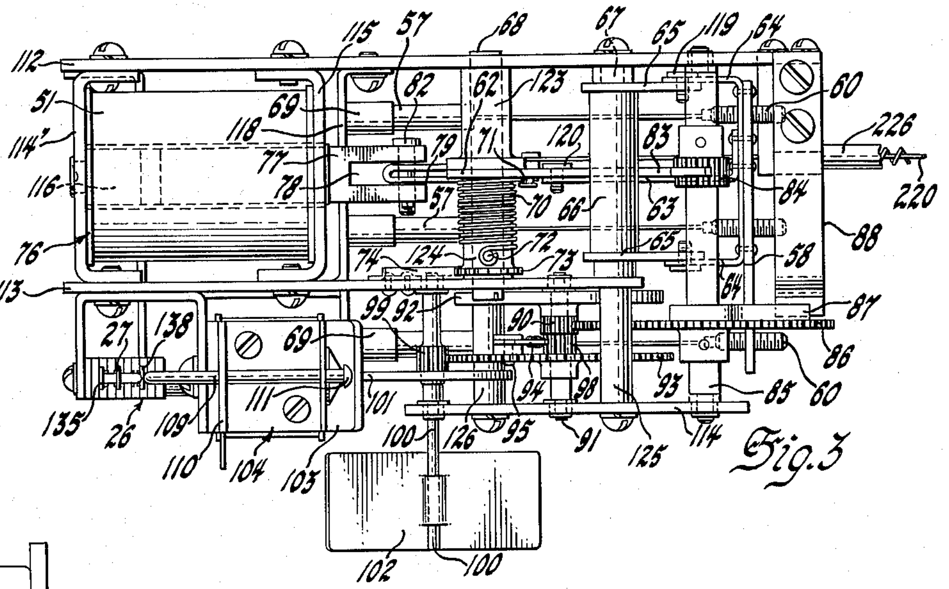
FIGURE 3 is a top plan view of the apparatus shown in FIGURE 2.

The solenoid 76 is of the short stroke ironclad type. The length of the magnetic stop 116, as best shown in FIGURE 3, is such as to provide a large starting force on the solenoid plunger. If the flywheel 92, which is fixed to the pinion 90, were not present, the solenoid would complete its stroke almost instantly upon being energized. However, the flywheel 92 is so proportioned relative to the operating force of the solenoid that the latter must act for an appreciable period of time to bring the flywheel up to speed. The length of the solenoid stroke is such that the tuning cores 57 may be moved into the tuning means approximately half-way when the end of the solenoid plunger 77 hits the stop 116. However, the flywheel 92 is by this time revolving at a maximum speed so that it will continue to rotate to complete the movement of the tuning cores 57 to their initial starting position and also retension the spring 70. The elongated hole 81 in the link 79, which couples the solenoid plunger 77 to the lever 62, permits the lever to move the required distance after the solenoid plunger has reached its limit of travel.

At this time the switch operating member 87 has now moved to a point on the opposite side of switch operating spring 88, and therefore engages that side to move the switch operating spring 88 to its original position. This breaks the circuit between contact blades 131 and 129 to deenergize the solenoid 76 and completes the circuit between contact blades 129 and 130. Energy remaining in the flywheel 92 at the time that the switch operating member 87 contacts the switch operating spring 88 will depend to a considerable degree upon the voltage obtainable from the battery 47. Since this voltage may vary to a considerable extent, a buffer leaf spring 134 is provided to dissipate the flywheel energy when the switch operating member 87 contacts the switch operating spring 88 in the spring reloading direction.

If a signal is encountered as the lever 61 moves in a counterclockwise direction under the influence of the torsion spring 70, a control voltage pulse is produced on line 187 as previously described in detail. During tuning, the armature 103 is held against the pole 106 by the residual magnetism of the relay and this forces the movable switch arms of switch 26 to the right, as shown in FIG. 1. Thus line 187 is connected at this time to grid 29 of tube 21 through spring switch arms 137 and 27. Therefore, upon a station being tuned in an indexing positive voltage is applied to the grid 29 which is thus amplified through the audio amplifier section and applied to the transformer 43. The high potential terminal of the secondary 44 is directly connected to the relay coil 107 through line 192 and the opposite coil terminal is at this time connected to ground through line 193, switch blades 130 and 129, line 197, and switch blades 140 and 138. Thus coil 107 will be energized to produce a field opposing the residual magnetism of the relay and armature 103 will be released and pulled by spring 108 to stop brake disc 101 and index the receiver.

Thus the indexing to progressive stations over the band occurs during the scanning of said band through driving by spring 70 to cause the cores 57 to be withdrawn from their associated coils, and each time that the button 141 is depressed and released, the receiver will stop on the next adjacent station having sufficient signal strength to actuate the stopping mechanism. When the cores are substantially entirely withdrawn from their coils, limit switch operating means 87 operates switch 88 to energize the solenoid 76 to quickly return the cores to their original position within their associated coils so that the scanning cycle may be repeated. During this recocking period the solenoid has a relatively short stroke, but during that interval imparts energy to a flywheel which continues driving the tuning means to its initial position after the solenoid stops.

I claim:

1. In radio apparatus having variable tuning means for scanning the frequency band for stations in one direction, transmission means having a low speed end operably connected to said tuning means and a high speed end, power storage means connected to the low speed end of the transmission means tending to drive the tuning means at an excessive speed in the tuning direction, speed regulating means driven by the high speed end of the transmission means for regulating the movement of the tuning means to a speed suitable for tuning during travel in the one direction, stopping means acting upon the high speed end for automatically terminating movement of said tuning means by said power storage means in response to a signal, energizable means connected to said tuning means for quickly moving the same in the opposite direction to reload the power storage means, and inertia means connected to said transmission means to supply driving energy to continue to move the tuning means in the opposite direction after the energizable means is deenergized.

2. In radio apparatus having variable tuning means for scanning the frequency band for stations in one direction, transmission means having a low speed end operably connected to said tuning means and a high speed end, power storage means connected to the low speed end of the transmission means tending to drive the tuning means at an excessive speed in the tuning direction, speed regulating means driven by the high speed end of the transmission means for regulating the movement of the tuning means to a speed suitable for tuning during travel in the one direction, stopping means acting upon the high speed end for automatically terminating movement of said tuning means by said power storage means in response to a signal, energizable means connected to said tuning means for quickly moving the same in the opposite direction to reload the power storage means, inertia means connected to said transmission means to supply driving energy to continue to move the tuning means in the opposite direction, and uni-directional drive means in said transmission means between the inertia means and the high speed end.

3. In radio apparatus having variable tuning means, transmission means having a low speed end operably connected to said tuning means and a high speed end, power storage means connected to the low speed end of the transmission means tending to drive the tuning means at an excessive speed in the tuning direction, speed regulating means driven by the high speed end of the transmission means for regulating the movement of the tuning means to a speed suitable for tuning during travel in one direction, stopping means acting upon the high speed end for automatically terminating movement of said tuning means by said power storage means in response to a signal, inertia means connected to said transmission means to supply driving energy to move the tuning means under predetermined conditions, unidirectional drive means in said transmission means between the inertia means and the high speed end, and energizable means connected to the power storage means capable of recharging the same at a high rate of speed, said inertia means controlling the rate of speed at which the power storage means is recharged.

4. In radio apparatus having variable tuning means, transmission means having a low speed end operably connected to said tuning means and a high speed end, power storage means connected to the low speed end of the transmission means tending to drive the tuning means at an excessive speed in the tuning direction, speed regulating means driven by the high speed end of the transmission means for regulating the movement of the tuning means to a speed suitable for tuning, stopping means acting upon the high speed end for automatically terminating movement of said tuning means by said power storage means in response to a signal, inertia means connected to said transmission means to supply driving energy under predetermined conditions, unidirectional drive means in said transmission means between the inertia means and the high speed end, and energizable means operably connected to the power storage means to partially recharge the same and simultaneously power the inertia member so that the latter may complete the charging of the power storage means when the energizable means ceases to act.

5. In radio apparatus having variable tuning means, transmission means having a low speed end operably connected to said tuning means and a high speed end, power storage means connected to the low speed end of the transmission means tending to drive the tuning means at an excessive speed in the tuning direction, speed regulating means driven by the high speed end of the transmission means for regulating the movement of the tuning means to a speed suitable for tuning, stopping means acting upon the high speed end for automatically terminating movement of said tuning means by said power storage means in response to a signal, inertia means connected to said transmission means to supply driving energy under predetermined conditions, unidirectional drive means in said transmission means between the inertia means and the high speed end, energizable means operably connected to the power storage means to partially recharge the same and simultaneously power the inertia member so that the latter may complete the charging of the power storage means when the energizable means ceases to act, and lost motion means connected between the energizable means and the power storage means to provide for relative motion between the two.

6. In radio apparatus having variable tuning means, power storage means connected thereto, transmission means having a low speed end operably connected to said tuning means and a high speed end, speed regulating means driven by said high speed end for regulating the movement of the tuning means when driven by the power storage means, electromagnetic means operably connected to said power storage means capable of charging said power storage means at an excessive rate of speed, an inertia member connected to said transmission means and driven thereby for controlling the speed at which said electromagnetic means recharges the power storage means, and unidirectional drive means in the transmission between the inertia member and the high speed end.

7. In radio apparatus having variable tuning means, power storage means connected thereto, transmission means having a low speed shaft, an intermediate shaft, and a high speed shaft, with said low speed shaft operably connected to said tuning means, speed regulating means driven by said high speed shaft for regulating the movement of said tuning means when driven by said power storage means, electromagnetic means connected to the power storage means and capable of recharging said power storage means at an excessive rate of speed, an inertia member on said intermediate shaft for controlling the speed at which said electromagnetic means recharges said power storage means, and unidirectional drive means between said inertia member and said high speed shaft.

8. In radio apparatus having variable tuning means, power storage means connected thereto, transmission means having a low speed end operably connected to said tuning means and a high speed end, speed regulating means connected to said high speed end to regulate the movement of said tuning means when driven by said power storage means, an intermediate shaft in said transmission means, electromagnetic means connected to the power storage means and capable of recharging said power storage means at an excessive rate of speed, an inertia member on said intermediate shaft to control the speed at which said electromagnetic means recharges said power storage means, and unidirectional drive means between said inertia member and said speed regulating means.

9. In radio apparatus having variable tuning means, power storage means connected thereto to drive the tuning means in one direction, transmission means having a low speed end operably connected to said tuning means and a high speed end, speed regulating means driven by said high speed end for regulating the speed of said tuning means when driven by said power storage means in said one direction, electromagnetic means for recharging said power storage means, having a movement substantially less than that required to fully charge said power storage means, and inertia means connected to and acted on by said electromagnetic means when charging said power storage means, of such character that said inertia means is capable of completing charging of said power storage means after the electromagnetic means is deenergized.

10. In radio apparatus having variable tuning means, power storage means connected thereto to drive the tuning means in one direction, transmission means having a low speed end operably connected to said tuning means and a high speed end, speed regulating means driven by the high speed end for regulating the speed of said tuning means when driven by said power storage means in said one direction, electromagnetic means for recharging said power storage means, having a movement substantially less than that required to fully charge said power storage means, the inertia of the parts driven by the electromagnetic means to charge the power storage means being sufficient to complete charging of the power storage means after the electromagnetic means is deenergized.

11. In radio apparatus having variable tuning means, power storage means connected thereto to drive the tuning means in one direction, transmission means, including an inertia member, having a low speed end operably connected to said tuning means, and a high speed end, speed regulating means driven by said high speed end for regulating the speed of said tuning means when driven by said power storage means in said one direction, electromagnetic means for recharging said power storage means, having a movement substantially less than that required to fully charge said power storage means, and a lost motion coupling means between the electromagnetic means and said power storage means so that said inertia member may complete the charging of the power storage means after the electromagnetic means is deenergized.

12. In radio apparatus having variable tuning means, power storage means for moving said tuning means, electromagnetic means for recharging said power storage means, transmission means having a low speed end operably connected to said tuning means and a high speed end, speed regulating means connected to said high speed end, a shaft in said transmission means, switch means for operating said electromagnetic means, means connected with said shaft to operate said switch means into one position to energize said electromagnetic means at the limit of rotation of said shaft in one direction, and to operate said switch means into another position to deenergize said electromagnetic means after said shaft has rotated in the opposite direction, and energy dissipating means cooperating with said switch means to check the rotation of said shaft after said switch means has been operated into said other position to deenergize said electromagnetic means.

13. In radio apparatus having variable tuning means, power storage means for moving said tuning means in a direction to tune the apparatus, solenoid recocking means connected to the power storage means to charge the latter when it has reached a limit of tuning movement, a transmission means connected to the power storage means and movable when the power storage means moves and carrying a switch actuating member, switching means controlling the electromagnetic means actuated by the switch actuating member to energize said electromagnet at one limit of travel of the tuning means and to deenergize the electromagnetic means at the other limit of movement of the tuning means, and energy dissipating means cooperating with the switching means to absorb energy at said other limit of movement of the tuning means.

14. In radio apparatus having variable tuning means, power storage means for moving said tuning means, electromagnetic means for recharging said power storage means, transmission means having a low speed end operably connected to said tuning means and a high speed end, speed regulating means connected to said high speed end, inertia means connected in the transmission means, switching means for operating the electromagnetic means, switch actuating means connected to the transmission means to operate said switching means at one limit of travel of the tuning means to energize the electromagnet and to operate the switching means to deenergize the electromagnet at the other limit of travel of the tuning means in the opposite direction, and energy dissipating means cooperating with the switching means to absorb the energy stored in the inertia means after the switching means has been operated into said other position to deenergize the electromagnetic means.

15. In radio apparatus having variable tuning means, transmission means having a low speed end and a high speed end, pivoted lever means operably connected to said low speed end, means connecting said tuning means to said lever means at a point a substantial distance from the pivot of said lever means, power storage means, including torsion spring means, at the pivot of said lever means to drive the same, speed regulating means connected to said high speed end to regulate the speed of said tuning means when driven in the tuning direction by said power storage means, and electromagnetic means for recharging said power storage means, having a travel substantially less than the travel of said variable tuning means, operably connected to said lever means closely adjacent the pivot.

16. In radio apparatus having variable tuning means which move in a relatively straight line, a pivoted lever, means for rotating said lever about its pivot, and means interconnecting said tuning means and the lever which is substantially rigid along it longitudinal dimension but may flex transversely thereof to cause rotation of the lever to move the tuning means but provide transverse adjustment for slight misalignment of parts, said last-named means including concave means connected to the lever and to the tuning means so that the concavities face each other, a stiff wirelike member between the two concave surfaces with its ends bearing thereagainst and a spirally wound spring member surrounding the wirelike member and having its ends threaded over the concave means to complete the interconnecting assembly and provide some transverse flexibility.

17. In radio apparatus having variable tuning means, power storage means for moving said tuning means, electromagnetic means for recharging said power storage means, transmission means having a low speed end operably connected to said tuning means and a high speed end, speed regulating means connected to said high speed end, inertia means connected in the transmission means, switching means for controlling the operation of the electromagnetic means, switch actuating means connected to the transmission means to operate said switching means at one limit of travel of the tuning means to energize the electromagnet and to operate the switching means to deenergize the electromagnet at the other limit of travel of the tuning means in the opposite direction and a cantilever spring arm having a free end mounted in spaced relation on one side of the switching means and engageable by said switching means after actuation of the same to deenergize the electromagnetic means, said spring arm absorbing the kinetic energy of the inertia means which carries the switch actuating means through its operating position.

18. In radio receiving apparatus having variable tuning means, energizable driving means for the tuning means to cause the latter to scan a desired frequency band, high frequency amplifier means having control elements, detecting means connected to the amplifier means to provide rectified signals, automatic volume control means interconnecting said detecting means and said control elements of the high frequency amplifier means to apply said rectified signals in inverse phase to said control elements to control the volume, said automatic volume control means including a variable resistance, a source of electrical power, conductive means including switching means coupling the variable resistance in the automatic volume control means to the source of electrical power to develop an independent voltage across said resistance to modify said automatic volume control and means for actuating said switching means to make said source of electrical energy effective across said variable resistance to develop a bias only when the energizable driving means is moving said tuning means and ineffective when the radio receiving apparatus is on station.

References Cited in the file of this patent

UNITED STATES PATENTS

| | | |
|---|---|---|
| Re. 23,474 | Sperber | Mar. 18, 1952 |
| 2,057,376 | Grillet | Oct. 13, 1936 |
| 2,157,871 | Steinert | May 9, 1939 |
| 2,493,741 | Andrews | Jan. 10, 1950 |
| 2,511,580 | Goodrich | June 13, 1950 |
| 2,569,426 | O'Brien | Sept. 25, 1951 |
| 2,580,895 | De Tar | Jan. 1, 1952 |
| 2,622,202 | Gierwiatowski | Dec. 16, 1952 |
| 2,639,373 | Goodrich | May 19, 1953 |
| 2,642,746 | Hulst | June 25, 1953 |
| 2,651,397 | Miller | Sept. 8, 1953 |
| 2,706,787 | Sperber | Apr. 19, 1955 |
| 2,743,620 | Schwartz | May 1, 1956 |
| 2,751,503 | Schwartz | June 19, 1956 |